(12) United States Patent
Elvanoglu et al.

(10) Patent No.: US 8,577,984 B2
(45) Date of Patent: *Nov. 5, 2013

(54) STATE MANAGEMENT IN A DISTRIBUTED COMPUTING SYSTEM

(75) Inventors: Ferhan Elvanoglu, Redmond, WA (US);
Mark Markaryan, Seattle, WA (US);
Nirav A. Kamdar, Redmond, WA (US);
Robert J. Osborne, Redmond, WA (US); Sanjib K. Dutta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 332 days.

This patent is subject to a terminal disclaimer.

(21) Appl. No.: 13/211,255

(22) Filed: Aug. 16, 2011

(65) Prior Publication Data
US 2012/0036185 A1 Feb. 9, 2012

Related U.S. Application Data

(63) Continuation of application No. 11/118,154, filed on Apr. 29, 2005, now Pat. No. 8,001,205.

(51) Int. Cl.
*G06F 15/16* (2006.01)
(52) U.S. Cl.
USPC ............................. 709/207; 709/206; 709/238
(58) Field of Classification Search
None
See application file for complete search history.

(56) References Cited

U.S. PATENT DOCUMENTS

| | | | |
|---|---|---|---|
| 5,794,216 A | 8/1998 | Brown | |
| 5,802,492 A | 9/1998 | DeLorme et al. | |
| 5,889,943 A | 3/1999 | Ji et al. | |
| 6,385,541 B1 | 5/2002 | Blumberg et al. | |
| 6,397,352 B1 | 5/2002 | Chandrasekaran et al. | |
| 6,522,875 B1 | 2/2003 | Dowling et al. | |
| 6,522,889 B1 | 2/2003 | Aarnio | |
| 6,552,682 B1 | 4/2003 | Fan | |
| 8,001,205 B2 | 8/2011 | Elvanoglu et al. | |
| 2002/0147780 A1* | 10/2002 | Liu et al. | 709/206 |
| 2003/0074413 A1* | 4/2003 | Nielsen et al. | 709/206 |
| 2004/0122903 A1* | 6/2004 | Saulpaugh et al. | 709/206 |
| 2004/0186918 A1* | 9/2004 | Lonnfors et al. | 709/206 |

* cited by examiner

*Primary Examiner* — Patrice Winder
*Assistant Examiner* — Nam Tran
(74) *Attorney, Agent, or Firm* — Perkins Coie LLP

(57) ABSTRACT

Techniques to allow applications to propagate information to the other instances of the applications running on downstream servers are provided. An indicator, such as a token, tag, etc., is placed within or added to a message that is flowing through the distributed environment to signify that a process has been performed on the message. For example, when an instance of an application running on a server receives a message, the application instance can examine the indicator contained in the message and take appropriate action. If the application instance decides to process the message, the application instance can include an indicator in the message to signify that the application instance processed the message. The presence of the indicator signifies that the message has been processed by an upstream instance of the same application.

18 Claims, 4 Drawing Sheets

STATE MANAGEMENT IN A DISTRIBUTED COMPUTING SYSTEM

CROSS REFERENCE TO RELATED APPLICATION

This application is a continuation application of U.S. application Ser. No. 11/118,154, filed on Apr. 29, 2005 now U.S. Pat. No. 8,001,205, which is incorporated in its entirety by reference.

TECHNICAL FIELD

The described technology is directed generally to distributed computing and, more particularly, to propagating state information between instances of an application running in a distributed environment.

BACKGROUND

Today, many enterprise server applications and products process thousands of client requests each day. These server applications are typically deployed in a load balanced environment to allow requests (also referred to herein as "messages") coming from different clients to be served by different servers from a cluster (also referred to herein as a "pool") of servers. If a request received at a server is meant to be routed to a destination client, the request may flow through other servers in the same pool, or servers in a different pool en route to the destination client. These server applications are commonly based on the client-server paradigm, where the application or system is split between the server (e.g., server tasks) and the client (e.g., client tasks). In client-server terminology, a client sends a request to a server, according to some protocol, typically asking the server to perform an action and the server responds to the client's request.

For example, enterprise server applications, such as MICROSOFT Live Communications Server 2005 (LCS), are deployed as a pool of stateless servers, and messages flow between the clients utilizing the application by traversing multiple servers in one or more pools. In addition to, or as part of the server application, the individual servers may host custom applications, such as applications that perform authentication services, applications that perform logging services, applications that perform archiving services, applications that perform statistical data collection, etc. These applications accordingly process the messages that flow through the server—e.g., to perform some custom processing—before the messages are forwarded to the next server in the route to their destination.

Often times, an instance of an application that is running on one server needs to know whether a message flowing through the servers has already been processed by another instance of the application running on another server. For example, an archiving application may be running on each of the enterprise server application servers to log messages to a database. When a message arrives at the first enterprise server application server, the instance of the archiving application running on that server logs the message. The message then travels to a subsequent enterprise server application server, and the message is processed by another instance of the archiving application. In order to avoid re-logging of the same message, the archiving application needs to know whether the message was previously logged—i.e., processed—by another instance of the archiving application.

It would be desirable to have a technique for propagating information regarding the state of a message between instances of an application running in a distributed environment.

DETAILED DESCRIPTION

Figure 1:
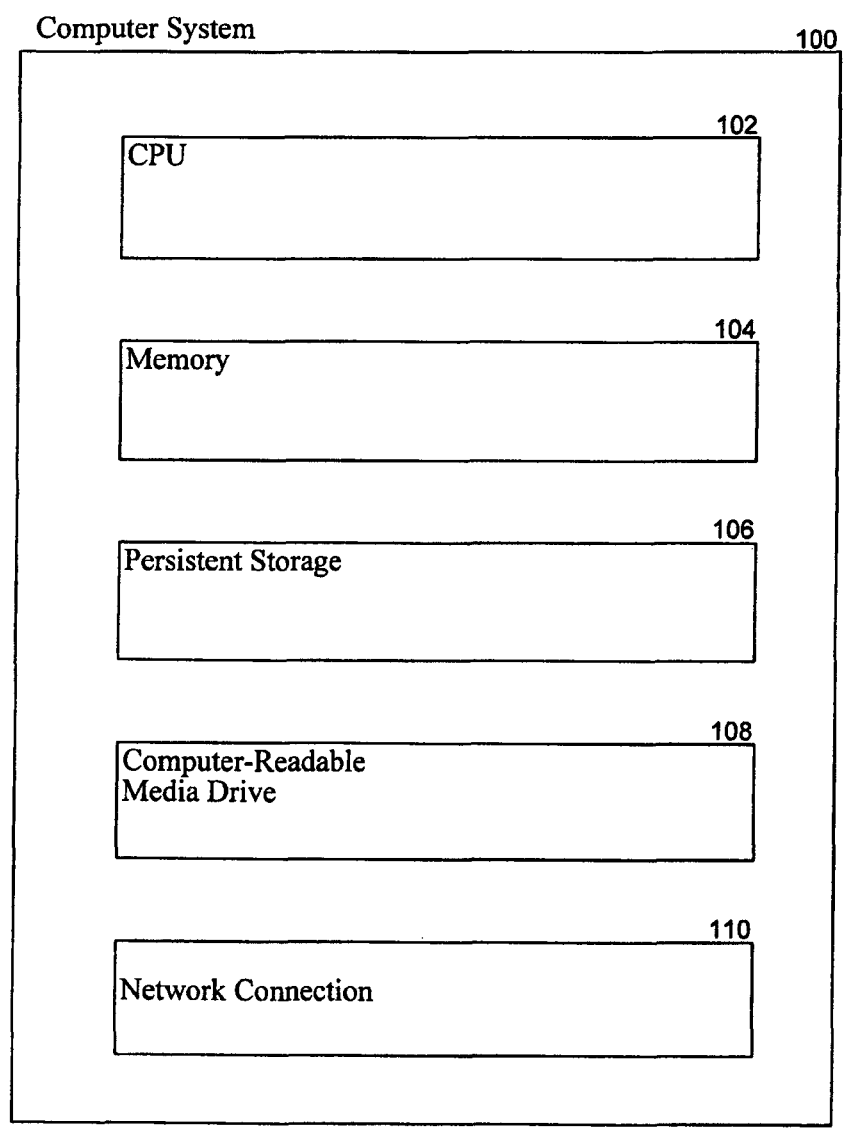
FIG. 1 is a block diagram illustrating selected components typically incorporated in at least some of the computer systems suitable for carrying out the described techniques in accordance with various embodiments of the present invention.

Various techniques that allow applications to propagate information to the other instances of the applications running in a distributed environment are provided. In some embodiments, an indicator, such as a token, tag, etc., is placed within or added to a message that is flowing through the distributed environment to signify that a process—e.g., logging or any other action—has been performed on the message. When an instance of an application running in the distributed environment receives the message, the application instance can examine the indicator and take appropriate action.

For example, an instance of an application may be running on each of the servers in a distributed environment. When a message enters the distributed environment, the instance of the application that first processes the message tags the message to indicate that the application has processed the message. As the message flows through the various servers in the distributed environment, down stream instances of the application can check for the presence of the tag and/or examine the content of the tag in order to make appropriate decisions regarding further processing of the message.

In some embodiments, a tag universally identifies the application that processes the message. For example, a tag in a message may contain information that identifies an application that processed the message. The tag, if present in a message, provides enough context to enable an application to determine whether the message has been processed by another instance of the same application.

In some embodiments, a tag identifies the application that processes the message at a domain level. For example, a tag in a message may contain information that identifies an application that processed the message and a domain in which the message was processed. The domain—i.e., group, cluster, pool, etc. —provides information regarding the location where the message was processed. For example, an application, such as an archiving application, may be deployed in two branch offices of an enterprise, where each branch office is configured as a separate pool comprised of multiple servers, and an instance of the archiving application may be running on each of the servers in the two pools. In order to log a message in each branch office—i.e., pool—but not multiple times in the same branch office, an administrator can provide two different sets of tags, one set of tags to the servers in one pool and another set of tags to the servers in the other pool, in order to log the message once per pool. Each tag identifies both the archiving application and the pool in which the archiving application is executing. Using the two different sets of tags allow the instances of the archiving application to determine whether a message has been processed by another instance of the same application, as well as the identity or location of the server on which the application that processed the message was running.

In some embodiments, a server may tag a message on behalf of an application that is running on the server in order to provide backward compatibility where the application does not contain the logic for processing the tags. The backward compatibility may be provided for applications that are capable of setting an attribute (also referred to herein as "TransparentSinglePoolProcessing" attribute), for example, in its manifest, to indicate that only one instance of an application is to process a message once per pool. A program, such as a dispatcher program, that is running on the server and dispatching messages to the applications running on the server is aware of the pool in which it is executing. The dispatcher program can then use the attribute setting to control the message dispatch to the applications based on the content of the tag.

For example, to decide whether to dispatch a message to an application that has set its TransparentSinglePoolProcessing attribute, the dispatcher examines the message for a tag that corresponds to the application. If the message does not contain a tag corresponding to the application, the dispatcher dispatches the message to the application and tags the message on behalf of the application. If the message contains a tag corresponding to the application, the dispatcher examines the contents of the tag to determine if the dispatcher's pool is identified in the tag. If the pool is not identified, the dispatcher dispatches the message to the application and tags the message on behalf of the application to indicate that an instance of the application in the dispatcher's pool has processed the message. Conversely, if the pool is identified, an upstream instance of the application in the dispatcher's pool has already processed the message and the dispatcher does not dispatch the message to the application.

The various embodiments of the facility and its advantages are best understood by referring to FIGS. 1-4 of the drawings. The elements of the drawings are not necessarily to scale, emphasis instead being placed upon clearly illustrating the principles of the invention. Throughout the drawings, like numerals are used for like and corresponding parts of the various drawings.

FIG. 1 is a block diagram illustrating selected components typically incorporated in at least some of the computer systems suitable for carrying out the described techniques in accordance with various embodiments of the present invention. These computer systems 100 may include one or more central processing units ("CPUs") 102 for executing computer programs; a computer memory 104 for storing programs and data—including data structures—while they are being used; a persistent storage device 106, such as a hard drive, for persistently storing programs and data; a computer-readable media drive 108, such as a CD-ROM drive, for reading programs and data stored on a computer-readable medium; and a network connection 110 for connecting the computer system to other computer systems, such as via the Internet, to exchange programs and/or data—including data structures.

The techniques that allow applications to propagate information to the other instances of the applications running in a distributed environment may be described in the general context of computer-readable instructions, such as program modules, executed by computer systems 100 or other devices. Generally, program modules include routines, programs, objects, components, data structures, etc. that perform particular tasks or implement particular abstract data types. Memory 104 and persistent storage device 106 are computer-readable media that may contain instructions that implement the facility. It will be appreciated that memory 104 and persistent storage 106 may have various other contents in addition to the instructions that implement the described techniques.

It will be appreciated that computer systems 100 may include one or more display devices for displaying program output, such as video monitors or LCD panels, and one or more input devices for receiving user input, such as keyboards, microphones, or pointing devices such as a mouse. While computer systems 100 configured as described above are typically used to support the operation of the described techniques, it will be appreciated that the described techniques may be implemented using devices of various types and configurations, and having various components.

In the discussion that follows, embodiments of techniques that allow applications to propagate information to the other instances of the applications running in the distributed environment are described in conjunction with a variety of illustrative examples. It will be appreciated that the embodiments of the described techniques may be used in circumstances that diverge significantly from these examples in various respects.

Figure 2:
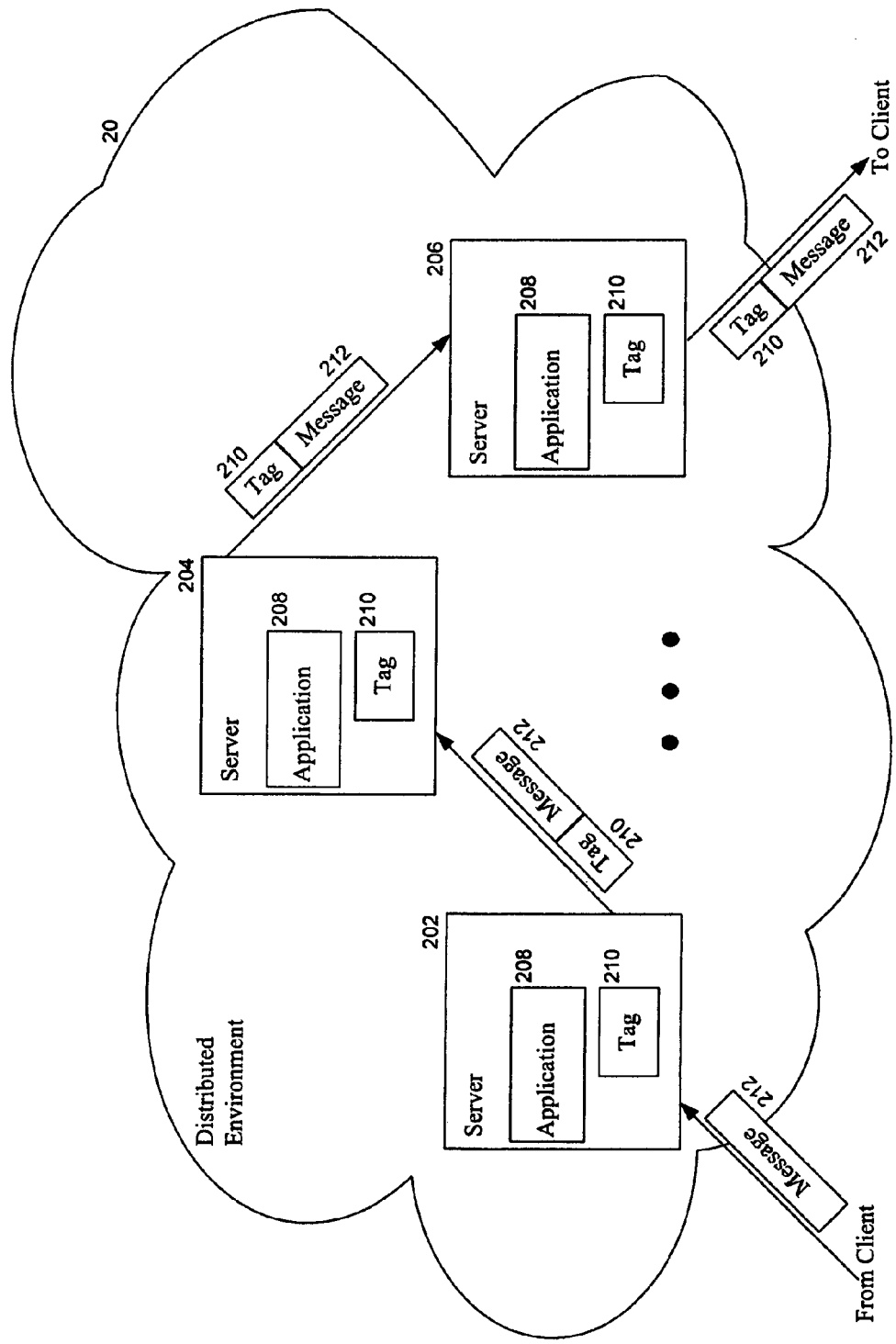
FIG. 2 is a block diagram illustrating an example flow of a message through a plurality of servers in a distributed environment, according to some embodiments.

FIG. 2 is a block diagram illustrating an example flow of a message through a plurality of servers in a distributed environment 20, according to some embodiments. As depicted, the distributed environment comprises a plurality of servers, including servers 202, 204 and 206, coupled to each other via a network, such as the Internet or other suitable network or communications link that facilitates the transfer of electronic content. Each of the plurality of servers may be hosting an instance of a server application 208 that operates to serve messages, for example, sent by clients for services provided by the server application. In this example, the application contains the logic to detect the presence of a tag in a message, to examine the content of a tag and take appropriate action, and to appropriately tag a message subsequent to or in conjunction with processing the message. As such, a user, such as an administrator of the server application, may have previously provided to each of the servers a tag 210 for use by the application running on each server.

In some embodiments, the tag may be implemented as a protocol header, such as a Session Initiation Protocol (SIP) Application Via Header. SIP is a signaling protocol that provides a mechanism for a computing device to locate another device it wants to communicate with over a computer network and to establish a communication session therewith. In particular, SIP is an Internet Engineering Task Force (IETF) standard protocol for initiating interactive user-sessions in a number of scenarios. The SIP Application Via Header complies with the SIP specification RFC 3261. An example format of the SIP Application Via Header may be:

MS-Application-Via:name;Application=AppId;
server=ServerId;pool=PoolId;

In the example SIP Application Via Header, MS-Application-Via is the name of the SIP header, "AppId" serves to identify the application, "ServerId" serves to identify the server on which an instance of the identified application is running, and "PoolId" serves to identify the pool the identified server belongs to. One skilled in the art will appreciate that the SIP Application Via header format may be different than the format in the example provided above. One skilled in the art will also appreciate that the protocol used to implement the tag is dependent on the protocol of the application and that the tag may be implemented using protocols other than SIP.

Returning to the example illustrated in FIG. 2, a client may send a message 212 requesting a service provided by the server application hosted by the servers in the distributed environment. Within the environment, the message may be initially received by server 202 for processing. Since the application running on this server is the first instance of the application to process the message (as indicated by the absence of the tag in the message), the instance of the application running on this server processes the message, tags the message, and sends the tagged message on its way to its destination. En route to its destination, the tagged message may be received by server 204 in the distributed environment. The instance of the application running on this server determines that the message contains a tag that matches its tag and sends the tagged message on its way to its destination without processing the message. Next, the tagged message may be received by server 206 in the distributed environment on its way to its destination. The instance of the application running on this server also determines that the message contains a tag that matches its tag and sends the tagged message on its way to its destination without processing the message. In this manner, the tagged message ultimately reaches its destination, for example, a destination client.

Figure 3:
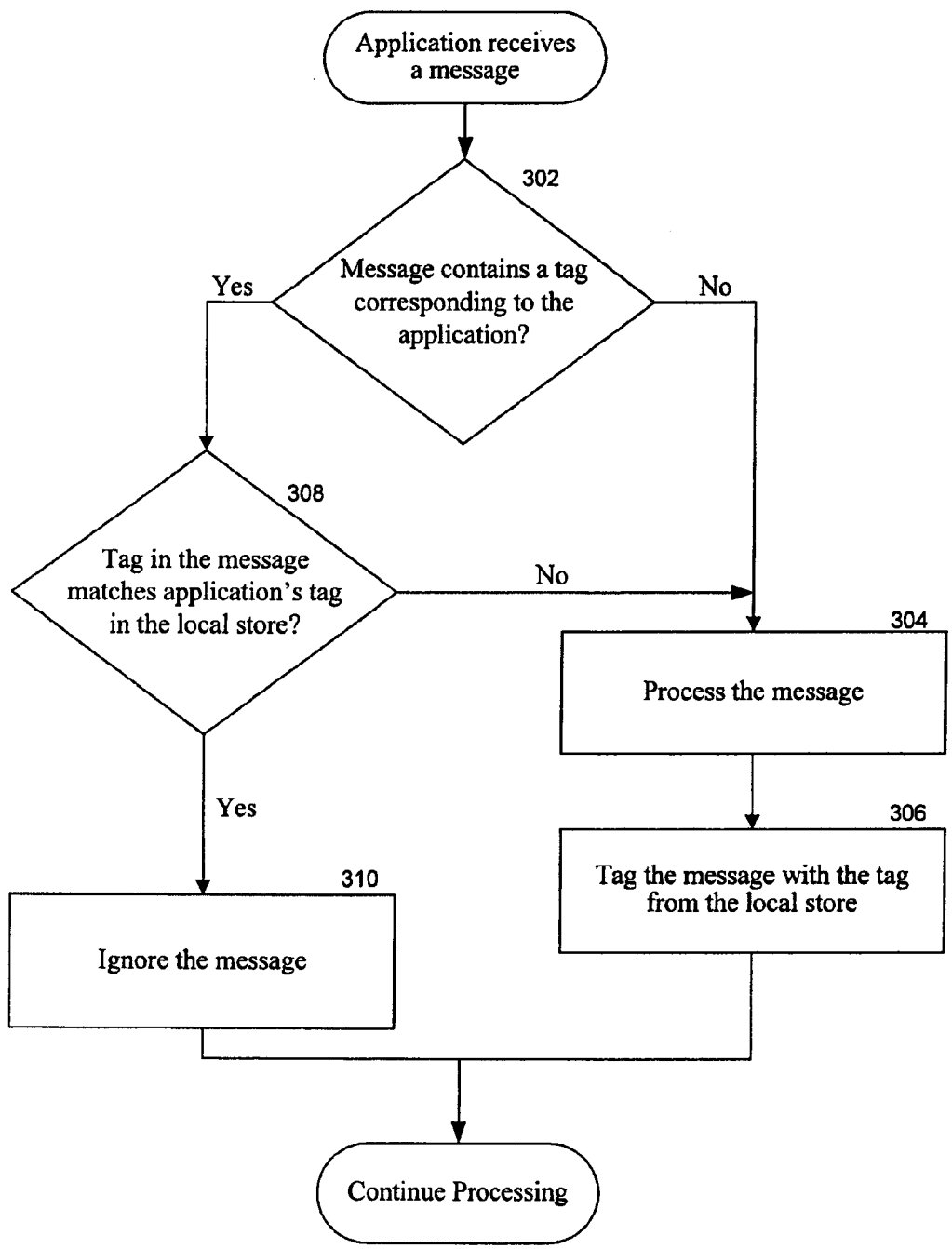
FIG. 3 is a flow diagram illustrating the processing of an application having knowledge of tags when it receives a message, according to some embodiments.

FIG. 3 is a flow diagram illustrating the processing of an application having knowledge of tags when it receives a message, according to some embodiments. By way of example, an administrator of the application may have provided on the server's local store a tag for use by the application running on server to determine whether the application is to process received messages. In block 302, the application checks the received message to determine if the message contains a tag corresponding to the application. The contents of the tag identify an application that attached or inserted the tag in the message. This allows multiple different applications that may be executing on the server to process the message and tag the message as being processed by these applications.

If the application does not find a tag that corresponds to the application in the message, then, in block 304, the application processes the message. For example, if the application is a logging application, then the application may log the presence of the message in a local store—e.g., data store. In block 306, the application tags the message with its tag from the local store, and continues processing. The application tags the message with its tag to indicate to downstream instances of the same application with the same tag that the message has already been processed.

If, in block 302, the application does find a tag that corresponds to the application in the message, then, in block 308, the application checks to determine if the tag from the message matches the application' tag in the local store. If the tags do not match, then the application processes the message (block 304) and tags the message with its tag from the local store (block 306), and continues processing. Otherwise, if the application determines that the two tags match, then the application ignores the message (block 310), and continues processing. Here, the matching tags indicate that an upstream instance of the same application with the same tag already processed the message.

A technical advantage provided by applications having knowledge of tags (i.e., containing logic to detect the presence of a tag in a message, to examine the content of a tag, to appropriately tag a message, etc.) is the increased flexibility in the use of the tag. The administrator is provided great flexibility in determining how to control the message processing as the message flows through the servers. For example, if the administrator decides to have an application process a message once per pool in a configuration of three pools of servers, the administrator can provide three different sets of tags for use by the application instances running on the three pools of servers. The application instances running on the same pool of servers will be provided the same tags. If the administrator decides to have an application process a message only once in the configuration of three pools of servers, the administrator can provide the same tag to all of the application instances running on the three pools of servers.

One skilled in the art will appreciate that, for this and other processes and methods disclosed herein, the functions performed in the processes and methods may be implemented in differing order. Furthermore, the outlined steps are only exemplary, and some of the steps may be optional, combined into fewer steps, or expanded into additional steps without detracting from the essence of the invention.

Figure 4:
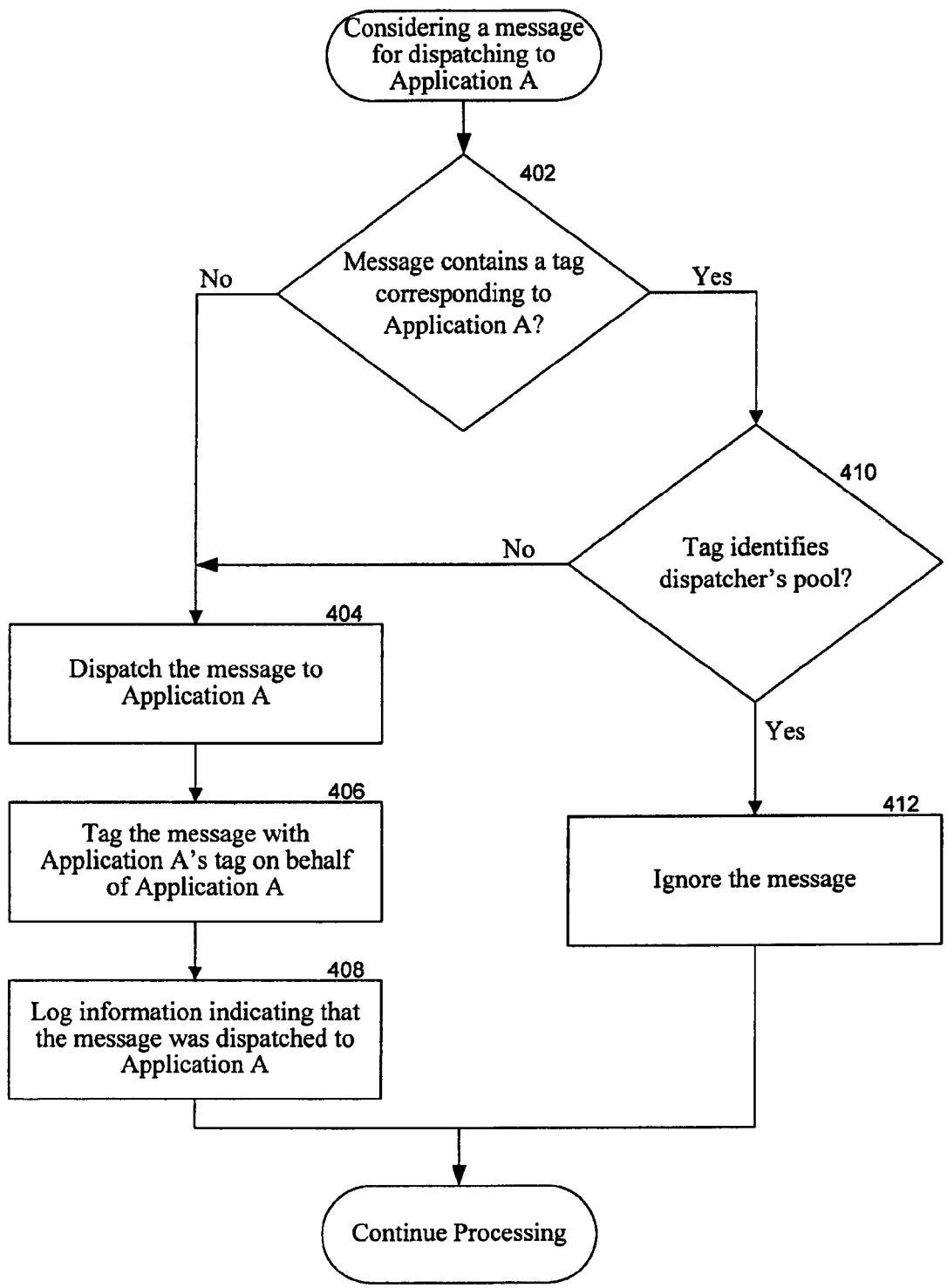
FIG. 4 is a flow diagram illustrating the processing of a dispatcher considering a message for dispatching to an application having no knowledge of tags, according to some embodiments.

FIG. 4 is a flow diagram illustrating the processing of a dispatcher considering a message for dispatching to an application having no knowledge of tags, according to some embodiments. By way of example, an administrator may have set an attribute in Application A's manifest—e.g., configuration—to indicate that an instance of Application A is to process a message only once per pool. Moreover, the dispatcher running on a server that dispatches the messages to the applications running on the server knows its pool identification—i.e., the dispatcher knows which pool it is executing within—and contains logic to check the setting of this attribute for the applications for which it is dispatching messages. Thus, the flow diagram of FIG. 4 illustrates the processing of the dispatcher on a message before dispatching to Application A, which is declared as an application that desires to process the message only once per pool.

In block 402, the dispatcher checks to determine whether the message contains a tag corresponding to Application A. In some embodiments, the tag is a Fully Qualified Domain Name (FQDN), which includes a local host name and a domain name, including the top-level domain. Thus, the dispatcher is able to determine whether Application A is identified in the tag.

If the dispatcher does not find a tag that corresponds to Application A in the message, then, in block 404, the dispatcher dispatches the message to Application A for processing. In block 406, the dispatcher tags the message with Application A's tag on behalf of Application A. For example, the dispatcher identifies Application A and its pool—i.e., the pool in which the dispatcher is executing—in the tag. In block 408, the dispatcher logs information, for example, in a local log, to indicate that the message was dispatched to Application A for processing.

If, in block 402, the dispatcher finds a tag that corresponds to Application A in the message, then, in block 410, the dispatcher checks the contents of the tag to determine if the tag identifies the dispatcher's pool. If the tag identifies the dispatcher's pool, then, in block 412, the dispatcher ignores the message and continues processing. Here, the tag that identifies the dispatcher's pool indicates that an upstream instance of Application A in the same pool already processed the message. Otherwise, if the tag does not identify the dispatcher's pool, then the dispatcher dispatches the message to Application A (block 404), tags the message with Application A's tag on behalf of Application A (block 406), and logs information to indicate that the message was dispatched to Application A for processing (block 408).

A technical advantage of having the dispatcher check the message for the presence of a tag before dispatching the message is the backward compatibility provided for applications that are capable of indicating that only one instance of the application is to process a message once per pool. This allows an application that does not contain the logic to process the tags to use the features provided by the tags—e.g., to propagate information to its other instances running on downstream servers—without any changes to its code/logic.

In some embodiments, a server or other computing device, such as a router, firewall, gateway machine, or other suitable machine, may tag a message to indicate that the message passed through the server. For example, a simple program may be loaded and executed on the server to tag each message passing through the server.

In some embodiments, a server or an application running on the server may remove or strip a tag contained in a message. For example, a server may remove the tag from a message as the message leaves the domain to which the server belongs. Similarly, an application may remove the tag from a message once the message has flowed through all instances of the application.

From the foregoing, it will be appreciated that embodiments of the invention have been described herein for purposes of illustration, but that various modifications may be made without deviating from the spirit and scope of the invention. Accordingly, the invention is not limited except in accordance with elements explicitly recited in the appended claims.

We claim:

1. A computer-implemented method in a computing system for propagating information regarding the processing of a message by an application executing within a domain, the method comprising:
providing an application indicator identifying the application and a domain indicator identifying the domain; and
under the control of an instance of the application executing in the domain, receiving a message for processing by the instance of the application; determining whether the message contains the application indicator and the domain indicator, such that the application indicator and the domain indicator contained in the message indicates that the message was previously processed by an instance of the application executing in the domain;
responsive to determining that the message contains the application indicator and the domain indicator, ignoring the message so that the message is only processed by one instance of the application executing in the domain; and
responsive to determining that the message does not contain the application indicator and the domain indicator, processing the message; and
placing the application indicator and the domain indicator within the message to indicate that the message was processed by an instance of the application executing in the domain.

2. The method of claim 1 wherein an indicator is a FQDN.

3. The method of claim 1 wherein the application indicator and the domain indicator are placed within the message as part of a message protocol header.

4. The method of claim 1 wherein the application indicator and the domain indicator are placed within the message as part of the message protocol.

5. The method of claim 1 wherein the domain includes a plurality of servers with multiple servers executing instances of the application.

6. The method of claim 5 wherein the message is routed to multiple servers executing an instance of the application.

7. The method of claim 1 wherein the application is an archiving application.

8. The method of claim 1 wherein the application is an authentication application.

9. A computer-readable storage device storing computer-executable instructions for causing a server executing within a pool of servers to perform a method comprising:
receiving a message for processing by an instance of the application;
determining whether the message contains an application indicator and a pool indicator, such that the application indicator and the pool indicator contained in the message indicate that the message was previously processed by an instance of the application executing in the pool;
responsive to determining that the message does not contain the application indicator and the pool indicator,
processing the message by an instance of the application; and
adding the application indicator and the pool indicator to the message to indicate that the message has been processed by an instance of the application executing in the pool;
responsive to determining that the message contains the application indicator and the pool indicator, suppressing processing of the message by an instance of the application so that the message is processed by only one instance of the application executing in the pool.

10. The computer-readable storage device of claim 9 wherein the tag contains an identifier of the application.

11. The computer-readable storage device of claim 10 wherein the servers are within a domain and the tag identifies the domain.

12. The computer-readable storage device of claim 9 wherein the tag added to the message conforms to SIP.

13. The computer-readable storage device of claim 9 wherein the tag added to the message is a SIP Application Via Header.

14. The computer-readable storage device of claim 9 wherein the tag indicates that the message is to be processed only once by the application.

15. A server for propagating information regarding the processing of messages by instances of an application executing within a domain that contains the server, comprising:
a memory storing computer-executable instructions of the application adapted to under the control of an instance of the application executing on the server,
receive a message for processing by the instance of the application;
determine whether the message contains an application indicator identifying the application and a domain indicator identifying the domain;
after determining that the message contains the application indicator and the domain indicator and before processing the message by the instance of the application, ignoring the message so that the message is not processed by the instance of the application; and
after determining that the message does not contain both the application indicator and the domain indicator,
processing the message by the instance of the application;
placing the application indicator and the domain indicator within the message to indicate that the message was processed by an instance of the application executing in the domain; and
placing a tag in the message indicating that the message is to be processed only once per domain; and
a processor that executes the computer-executable instructions of the application stored in the memory.

16. The server of claim 15 wherein the application indicator and the domain indicator are placed within the message as part of a message protocol header.

17. The server of claim 15 wherein the domain includes a plurality of servers with multiple servers executing instances of the application.

18. The server of claim 17 wherein the message is routed to multiple servers within the domain executing an instance of the application.

* * * * *